United States Patent
Akutsu

(10) Patent No.: US 7,222,971 B2
(45) Date of Patent: May 29, 2007

(54) PROJECTOR APPARATUS, PROJECTION METHOD, AND RECORDING MEDIUM STORING PROJECTION METHOD

(75) Inventor: Takashi Akutsu, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 196 days.

(21) Appl. No.: 10/925,163

(22) Filed: Aug. 24, 2004

(65) Prior Publication Data

US 2005/0046804 A1    Mar. 3, 2005

(30) Foreign Application Priority Data

Aug. 25, 2003    (JP)    ............... 2003-299888

(51) Int. Cl.
G03B 21/00    (2006.01)
G03B 21/14    (2006.01)
G03B 3/00    (2006.01)
H04N 3/22    (2006.01)

(52) U.S. Cl. .................. 353/69; 353/70; 353/101; 353/121; 348/745

(58) Field of Classification Search ............ 353/30, 353/31, 69, 70, 101, 121; 348/745, 806; 349/5, 7, 9

See application file for complete search history.

(56) References Cited

U.S. PATENT DOCUMENTS

| | | | |
|---|---|---|---|
| 6,049,385 A | | 4/2000 | Norita et al. |
| 6,416,186 B1 * | | 7/2002 | Nakamura ............ 353/69 |
| 6,592,227 B2 * | | 7/2003 | Ouchi et al. ............ 353/97 |
| 6,592,228 B1 | | 7/2003 | Kawashima et al. |
| 6,598,979 B2 * | | 7/2003 | Yoneno ............ 353/122 |
| 6,765,544 B1 | | 7/2004 | Willson et al. ............ 345/6 |
| 6,846,081 B2 * | | 1/2005 | Mochizuki et al. ............ 353/70 |
| 6,886,946 B2 * | | 5/2005 | Eguchi ............ 353/101 |
| 6,923,546 B2 * | | 8/2005 | Kurematsu ............ 353/97 |

(Continued)

FOREIGN PATENT DOCUMENTS

| | | |
|---|---|---|
| JP | 2000-241874 A | 9/2000 |
| WO | WO 02/21832 A2 | 3/2002 |

OTHER PUBLICATIONS

Japanese Patent Laid-Open Gazette No. JP 10-171045.*

(Continued)

*Primary Examiner*—Melissa Jan Koval
(74) *Attorney, Agent, or Firm*—Frishauf, Holtz, Goodman & Chick, P.C.

(57) ABSTRACT

A projector apparatus is disclosed which has a projection unit which projects image corresponding to an input image signal, an instruction unit which issues an instruction for performing keystone correction, a distance survey unit which surveys distances between the projector apparatus and a plurality of positions on the image projected by the projection unit in accordance with an instruction from the instruction unit, and a focus control unit which performs keystone correction of the image projected by the projection unit in a manner that the image becomes a rectangle having an appropriate aspect ratio based on the distances obtained by the distance survey unit, while bringing the image projected by the projection unit into focus at the center position of the image after being keystone-corrected.

4 Claims, 8 Drawing Sheets

U.S. PATENT DOCUMENTS

| | | | |
|---|---|---|---|
| 6,962,416 B2 * | 11/2005 | Ohara | 353/70 |
| 6,974,217 B2 * | 12/2005 | Kimura et al. | 353/69 |
| 2002/0105623 A1 | 8/2002 | Pinhanez | |
| 2003/0025649 A1 | 2/2003 | Willson et al. | |
| 2005/0046803 A1 * | 3/2005 | Akutsu | 353/69 |

OTHER PUBLICATIONS

Related Application: U.S. Appl. No. 11/028,804, filed Jan 3, 2005, Takashi Akutsu; Projector Apparatus, Projection Method, and Recording Medium Having Projection Method.

* cited by examiner

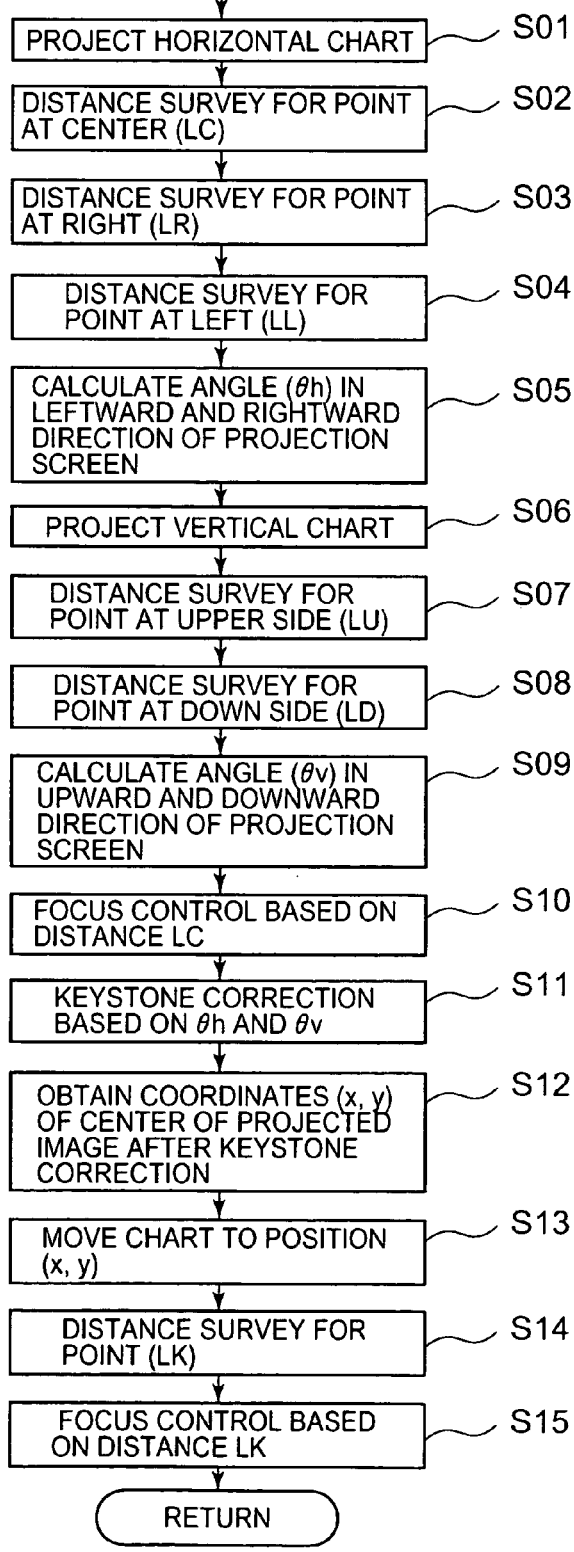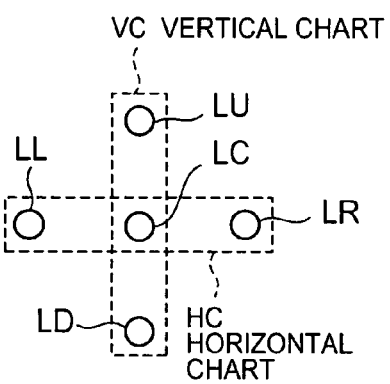

FIG. 8A

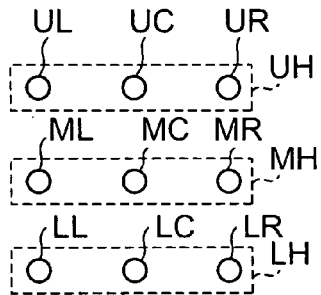

FIG. 8B

AFK PROCESS

PROJECT HORIZONTAL CHART UPPER IMAGE — S41

DISTANCE SURVEY FOR POINT AT CENTER (UC)
DISTANCE SURVEY FOR POINT AT LEFT (UL)
DISTANCE SURVEY FOR POINT AT RIGHT (UR) — S42

PROJECT HORIZONTAL CHART MIDDLE IMAGE — S43

DISTANCE SURVEY FOR POINT AT CENTER (MC)
DISTANCE SURVEY FOR POINT AT LEFT (ML)
DISTANCE SURVEY FOR POINT AT RIGHT (MR) — S44

PROJECT HORIZONTAL CHART LOWER IMAGE — S45

DISTANCE SURVEY FOR POINT AT CENTER (LC)
DISTANCE SURVEY FOR POINT AT LEFT (LL)
DISTANCE SURVEY FOR POINT AT RIGHT (LR) — S46

CALCULATE ANGLE ($\theta h$) IN LEFTWARD AND RIGHTWARD DIRECTION OF PROJECTION SCREEN — S47 (ML-MR)

CALCULATE ANGLE ($\theta v$) IN UPWARD AND DOWNWARD DIRECTION OF PROJECTION SCREEN — S48 (UC-LC)

KEYSTONE CORRECTION BASED ON $\theta h$ AND $\theta v$ — S49

OBTAIN COORDINATES (x, y) OF CENTER OF PROJECTED IMAGE AFTER KEYSTONE CORRECTION — S50

SELECT DISTANCE SURVEY PONT CLOSEST TO POSITION (x, y) — S51

LK←DISTANCE OF SELECTED POINT — S52

FOCUS CONTROL BASED ON DISTANCE LK — S53

RETURN

PROJECTOR APPARATUS, PROJECTION METHOD, AND RECORDING MEDIUM STORING PROJECTION METHOD

BACKGROUND OF THE INVENTION

1. Field of the Invention

The present invention relates to an automatic projector apparatus having a function for automatically bringing a projection image into focus, a projection method, and a recording medium storing a projection method.

2. Description of the Related Art

Conventionally, there has been proposed a carriable (portable) projector which is provided with a monitor camera therein, for monitoring a projection screen to automatically perform various adjustments necessary for displaying images (for example, Patent Document 1).

[Patent Document 1] Unexamined Japanese Patent Application KOKAI Publication No. 2000-241874

However, the carriable projector disclosed in the Patent Document 1 performs a focusing operation and a keystone correcting operation independently, by processing image data which is obtained by photographing by the monitor camera. Therefore, it takes a long time for all of these adjustments to be done.

These adjustments are specifically for changing the direction, elevation angle, and depression angle of the optical system of a projection lens. These adjustments require the structure of a lens system which has an optical "tilt" mechanism, which causes a problem that the apparatus becomes large-sized and complex.

SUMMARY OF THE INVENTION

A projector apparatus according to the present invention includes a projection unit which projects an image corresponding to an input image signal, an instruction unit which issues an instruction for performing keystone correction, a distance survey unit which surveys distances between the projector apparatus and a plurality of positions on the image projected by the projection unit in accordance with an instruction from the instruction unit, a keystone correction unit which performs keystone correction of the image projected by the projection unit such that the image becomes a rectangle having an appropriate aspect ratio based on the distances obtained by the distance survey unit, and a focus control unit which controls a lens of the projection unit so as to bring the keystone-corrected image corrected by the keystone correction unit into focus at a center position of the keystone-corrected image. The focus control unit brings the keystone-corrected image into focus based on a distance between the projector apparatus and the center position of the keystone-corrected image, wherein the distance to the center position of the keystone-corrected image is obtained by the distance survey unit by re-surveying.

BRIEF DESCRIPTION OF THE DRAWINGS

These objects and other objects and advantages of the present invention will become more apparent upon reading of the following detailed description and the accompanying drawings in which:

FIGS. 5A and 5B show flowcharts showing the content of a process of a subroutine of the AFK process shown in FIG. 4, and a supplementary diagram for the flowchart;

FIGS. 8A and 8B show flowcharts showing another content of the process of the subroutine of the AFK process shown in FIG. 4, and a supplementary diagram for this flowchart.

DETAILED DESCRIPTION OF THE PREFERRED EMBODIMENTS

One embodiment in which the present invention is applied to a projector apparatus will be explained with reference to the drawings.

Figure 1A:
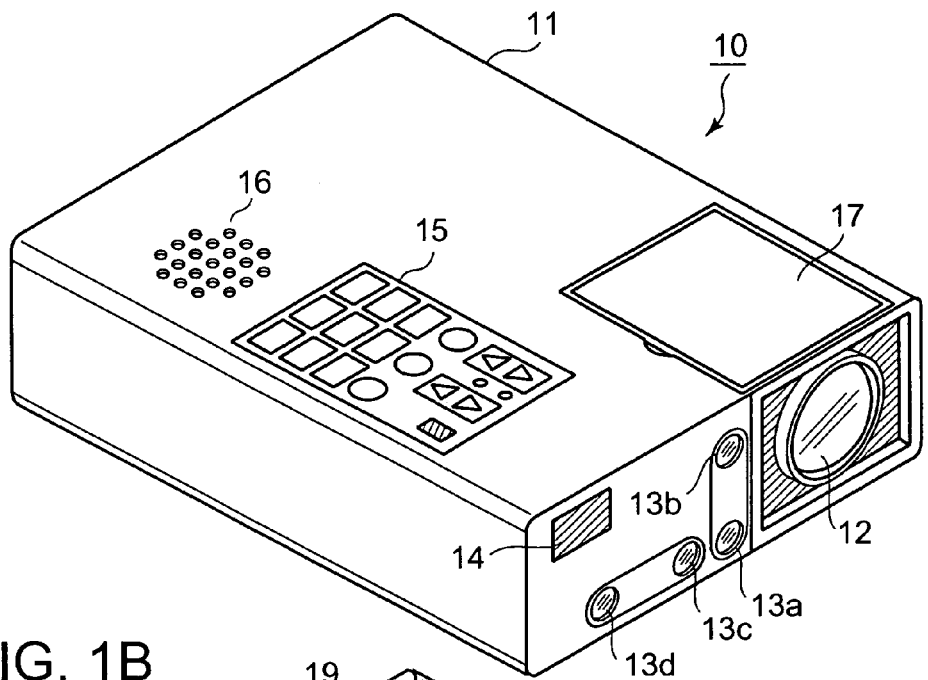
FIGS. 1A and 1B are perspective diagrams showing the appearance of a projector apparatus according to one embodiment of the present invention.

FIG. 1 show the appearance of a projector apparatus 10 according to the present embodiment. As shown in FIG. 1A, a projection lens 12, two pairs of distance survey lenses 13a and 13b, and 13c and 13d, and an Ir reception unit 14 are provided on the front surface of a rectangular-parallelepiped-shaped body casing 11.

The projection lens 12 projects an optical image which is formed by a later-described spatial optical modulation element such as a micromirror element or the like. The projection lens 12 can arbitrarily change its in-focus position and zoom position (angle of view for projection).

The distance survey lenses 13a, 13b, 13c, and 13d respectively constitute part of phase difference sensors 131 and 132 to be described later. The distance survey lenses 13a, 13b, 13c, and 13d survey the distance between the projector apparatus 10 and a photo object, specifically, the distance between the projector apparatus 10 and the surface of a projected image, according to the principle of triangulation based on a parallax error between these pairs of distance survey lenses with respect to the photo object.

Specifically, one pair of distance survey lenses 13a and 13b which are arranged vertically survey the distance between the projector apparatus 10 and the photo object in the vertical direction, and the other pair of distance survey lenses 13c and 13d which are arranged horizontally survey the distance between the projector apparatus 10 and the photo object in the horizontal direction, by focusing a light flux for distance survey output from an unillustrated distance survey laser onto the photo object.

The projector apparatus 10 has an unillustrated remote controller. The Ir reception unit 14 receives an infrared light on which a key operation signal from the remote controller is superposed.

A body main key/indicator 15, a speaker 16, and a cover 17 are arranged on the top surface of the body casing 11.

The body main key/indicator 15 will be explained in detail later.

The speaker 16 amplifies and outputs a sound when, for example, a motion picture is played.

The cover 17 is opened or closed when a body sub key (unillustrated) is operated. The body sub key is used for controlling various specific operations which can not be set by keys of the body main key/indicator 15, without using the unillustrated remote controller of the projector apparatus 10.

Figure 1B:
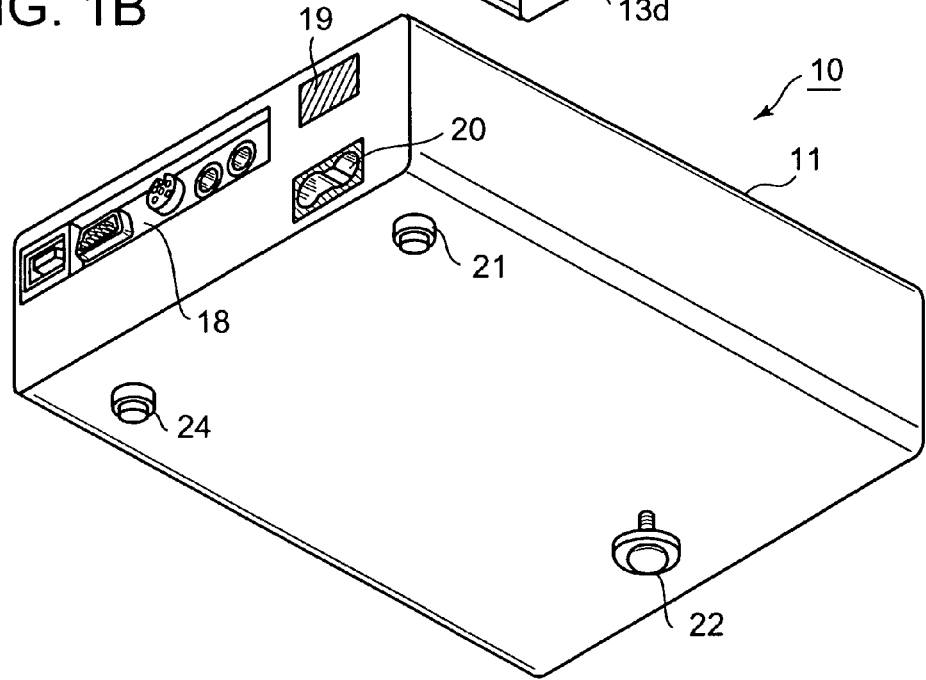

As shown in FIG. 1B, an input/output connector unit 18, an Ir reception unit 19, and an AC adaptor connection unit 20 are provided on the back surface of the body casing 11.

The input/output connector unit 18 comprises a USB terminal for connection with foreign apparatuses such as a personal computer for allowing images to be input and output therebetween, a mini D-SUB terminal, S terminal, and RCA terminal for image input, a stereo mini terminal for audio input, etc.

The Ir reception unit 19 receives an infrared light on which a key operation signal from the unillustrated remote controller is superposed, likewise the Ir reception unit 14 described above.

The AC adaptor connection unit 20 has a cable from a power source AC adaptor (unillustrated) connected thereto.

A pair of fixing legs 21 and 21 are provided at the back surface side of the bottom surface of the body casing 11, and an adjusting leg 22 which can be adjusted in its height is provided at the front surface side of the same bottom surface.

By its position, which can be adjusted by screw rotation, being manually adjusted, the adjusting leg 22 adjusts the vertical direction component, i.e. the elevation angle of the projection lens 12 in the projection direction.

Figure 2:
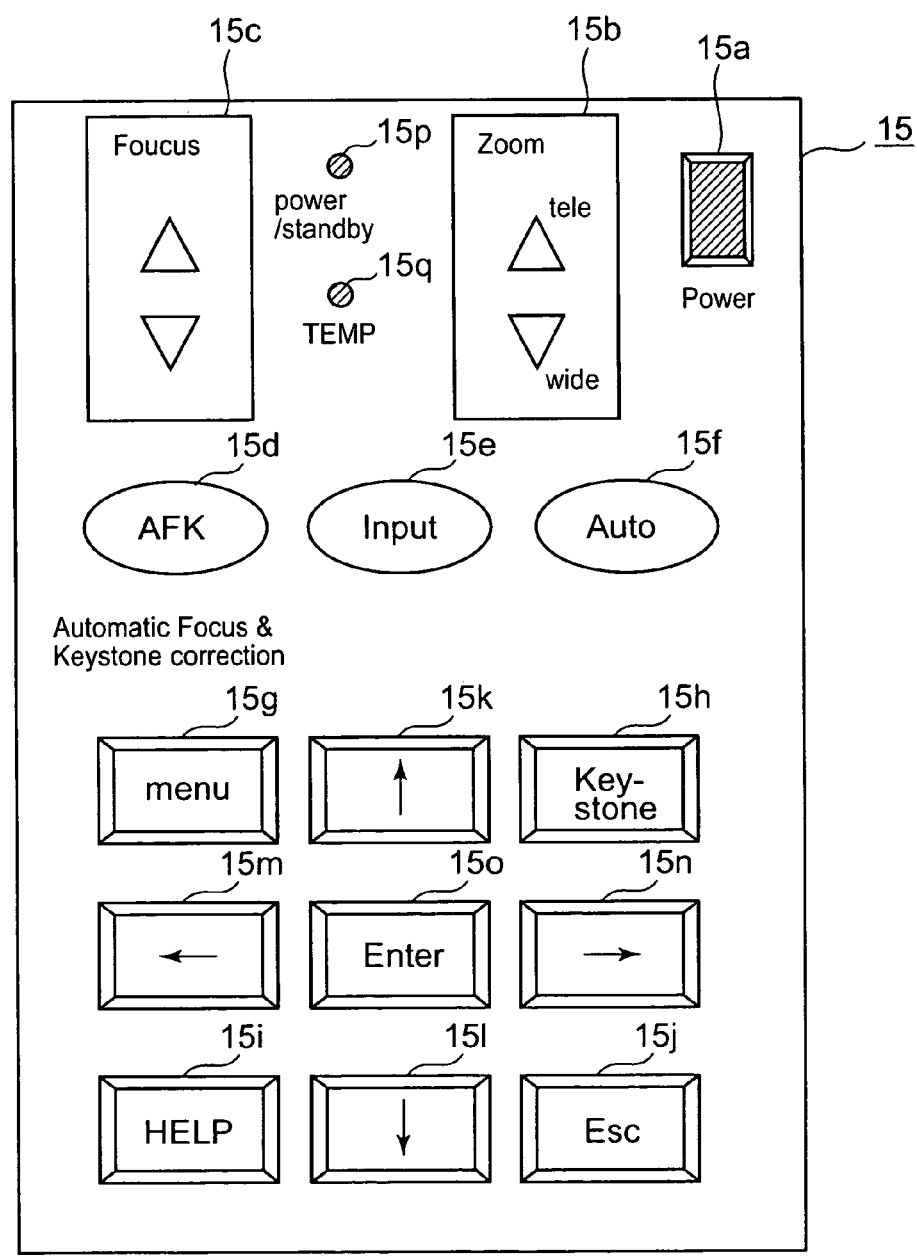
FIG. 2 is a diagram showing the arrangement of a body main key/indicator shown in FIG. 1.

FIG. 2 shows a detailed arrangement of the body main key/indicator 15. The body main key/indicator 15 comprises a power key 15a, a zoom key 15b, a focus key 15c, an "AFK" key 15d, an "input" key 15e, an "auto" key 15f, a "menu" key 15g, a "keystone" key 15h, a "help" key 15i, an "Esc" key 15j, an "up (↑)" key 15k, a "down (↓)" key 15l, a "left (←)" key 15m, a "right (→)" key 15n, an "enter" key 15o, a power/standby indicator 15p, and a temperature (TEMP) indicator 15q.

The power key 15a is operated for giving an instruction for switching on or off the power source.

The zoom key 15b ("Δ" and "∇") is operated for giving an instruction for zooming up (telephoto) or down (wide).

The focus key ("Δ" and "∇") is operated for giving an instruction for moving the in-focus position frontward or backward.

The "AFK" key 15d (instruction unit) is operated for giving an instruction for immediately performing automatic focus and automatic keystone correction.

The "input" key 15e is operated for giving an instruction for manually switching image signals to be input to any of the input/output connector unit 18. The "auto" key 15f is operated for giving an instruction for automatically switching image signals to be input to any of the input/output connector unit 18.

The "menu" key 15g is operated for giving an instruction for displaying menu items regarding projection operations. The "keystone" key 15h is operated for giving an instruction for manually performing keystone correction.

The "help" key 15i is operated for giving an instruction for displaying help information in the event that the user is uncertain about the operations. The "Esc" key 15j is operated for giving an instruction for escaping from the current operation.

The "up" key 15k, the "down" key 15l, the "left" key 15m, and the "right" key 15n are operated for giving an instruction for selecting menu items or designating the direction for manual keystone correction or the direction in which a pointer, a cursor, or the like is moved.

The power/standby indicator 15p indicates the on/off state of the power source and a state where no image signal is input, by, for example, turning on/off or blinking green and red LEDs.

The temperature indicator 15q indicates whether or not the temperature of a lamp, which is the light source of image projection, is in the right state for projection, by, for example, turning on/off or blinking green and red LEDs.

Figure 3:
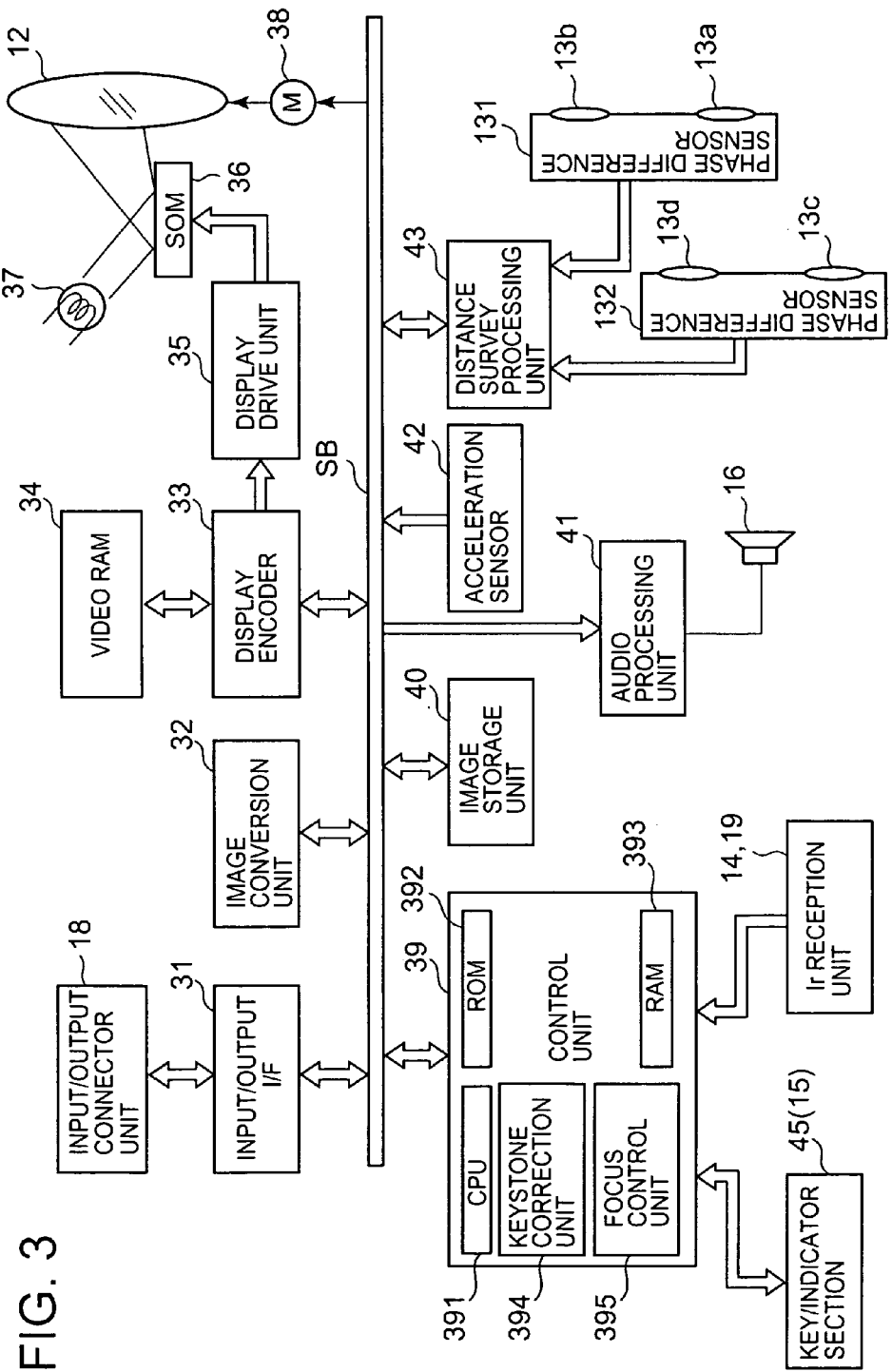
FIG. 3 is a block diagram showing a functional circuit configuration inside the projector apparatus according to the embodiment of the present invention.

Next, the functional configuration of the electronic circuit of the projector apparatus 10 will be explained with reference to FIG. 3. In FIG. 3, image signals of different standards which are input from the input/output connector unit 18 are standardized to image signals of a predetermined format in an image conversion unit 32 through an input/output interface (I/F) 31 and system bus SB, and are then transmitted to a display encoder 33.

The display encoder 33 expands and stores the transmitted image signals in a video RAM 34, generates a video signal based on the stored content in the video RAM 34, and outputs the video signal to a display drive unit 35.

The display drive unit 35 drives a spatial optical modulator (SOM) 36 to perform a display operation, by an appropriate frame rate corresponding to the transmitted video signal, for example, 30 [frames/sec]. When the display drive unit 35 irradiates a white light of a high luminance emitted from a light source lamp 37 constituted by, for example, an extra-high pressure mercury lamp or the like, onto the spatial optical modulator 36, an optical image is formed by a reflected light from the spatial optical modulator 36 and is projected on an unillustrated screen via the projection lens 12.

The projection lens 12 arbitrarily moves the zoom position and focus position by being driven by a lens motor (M) 38. The display drive unit 35, the spatial optical modulator (SOM) 36, the light source lamp 37, the projection lens 12, and the lens motor (M) 38 constitute a projection section.

The operations of each of the above-described circuits are controlled by a control unit 39. The control unit 39 comprises a CPU 391, a ROM 392 fixedly storing operation programs to be executed by the CPU 391, a RAM 393 used as a work memory, a keystone correction unit 394 for performing keystone correction of an image to be projected, and a focus control unit 395 for focusing on the center position of a keystone-corrected image.

An image storage unit 40, an audio processing unit 41, an acceleration sensor 42, and a distance survey processing unit 43 are connected to the control unit 39 via the system bus SB.

The image storage unit 40 is constituted by, for example, a flash memory or the like, and stores image data of later-described chart images (horizontal chart image and vertical chart image) and the like. The image storage unit 40 reads out image data designated by the control unit 39 and transmits the image data to the display encoder 33, so that images represented by the image data are projected through the projection lens 12.

The audio processing unit 41 comprises a sound source circuit such as a PCM sound source or the like, analog-converts audio data supplied during a projection operation, and drives the speaker 16 to loudly output the audio.

The acceleration sensor 42 detects a fluctuation of the projector apparatus 10 when the projector apparatus 10 is moved from the state where it is set still, and outputs a detection signal to the control unit 39.

The distance survey processing unit 43 (distance survey unit) drives the phase difference sensor 131 having the distance survey lenses 13a and 13b and the phase difference sensor 132 having the distance survey lenses 13c and 13d, thereby surveys the distance between the projector apparatus 10 and an arbitrary point in a projected chart image to be described later.

The body main key/indicator 15 and the body sub key provided in the cover 17 constitute a key/indicator section 45. A key operation signal from the key/indicator section 45 is directly input to the control unit 39. The control unit 39 directly drives the power/standby indicator 15p and the temperature indicator 15q to be turned on or blinked. An infrared light signal received by the Ir reception unit 14 or the Ir reception unit 19 is directly input to the control unit 39.

An operation according to the present embodiment will now be explained.

Figure 4:
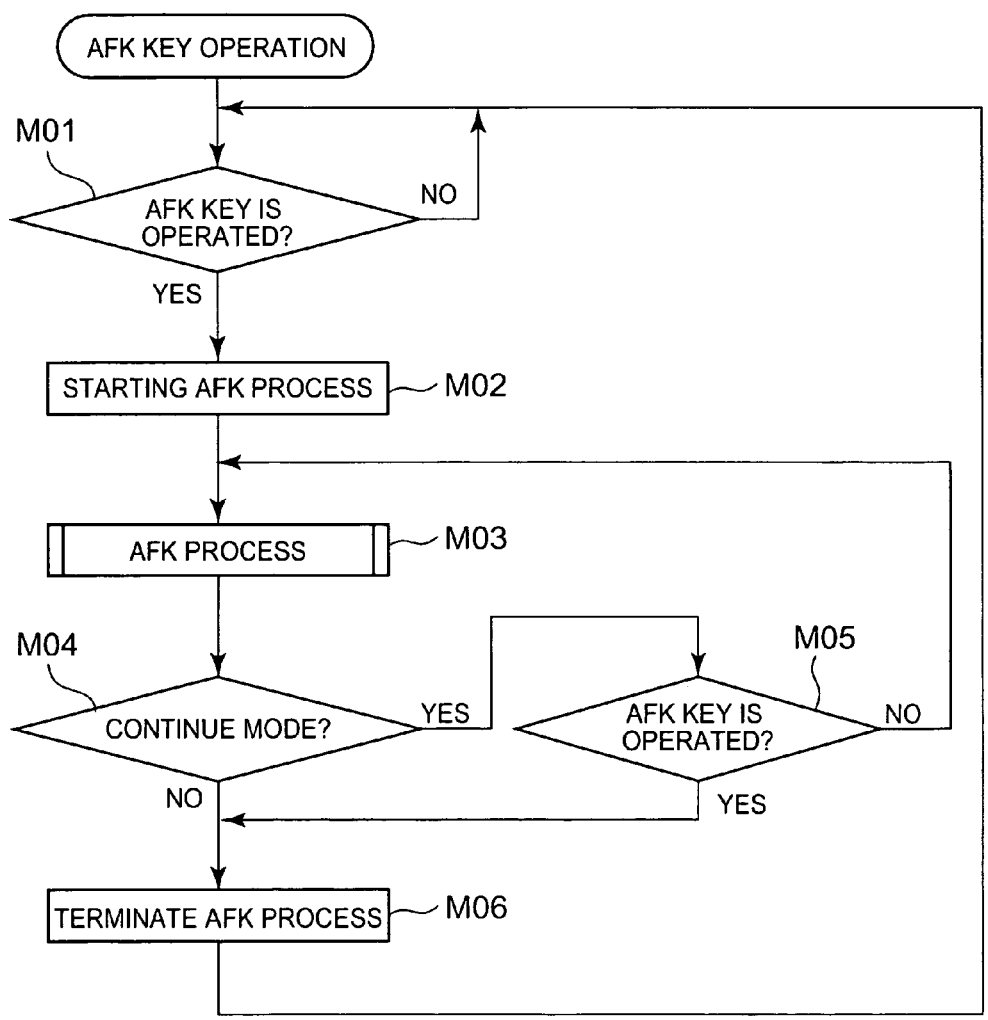
FIG. 4 is a flowchart showing the content of a process regarding operation of an AFK key according to the embodiment of the present invention.

FIG. 4 shows the contents of automatic focus and automatic keystone correction processes as interruption processes to be forcibly performed upon operation of the "AFK" key 15d of the body main key/indicator 15 while the power is turned on. The control for this process is performed by the control unit 39 based on an operation program stored in its ROM.

The user arbitrarily sets any one of a one shot mode and a continue mode by operating the "menu" key 15g, the "up" key 15k, the "down" key 15l, the "enter" key 15o, and the like of the body main key/indicator 15. The one shot mode is for performing the automatic focus process and automatic keystone correction process only once, upon operation of the "AFK" key 15d. The continue mode is for continuously performing the automatic focus process and automatic keystone correction process repeatedly from when the "AFK" key 15d is operated for the first time until when the "AFK" key 15d is operated next.

At the beginning of the process, operation of the "AFK" key 15d is waited (step M01). When it is determined that the "AFK" key 15d is operated, the operation that has been going on until then is suspended and a state for starting the automatic focus process and automatic keystone correction process as the interruption processes is set (step M02). Then, automatic focus and automatic keystone correction for the first time are performed (step M03).

FIG. 5A shows a subroutine representing the content of the automatic focus process and automatic keystone correction process. At the beginning of the process, a horizontal chart image HC shown in FIG. 5B is projected by the projection system including the projection lens 12 based on image data stored in the image storage unit 40 (step S01).

This horizontal chart image HC is made up of three point images which are arranged at regular intervals in the horizontal direction.

While the horizontal chart image HC is projected, a distance LC between the projector apparatus 10 and the position of the projection image of the point arranged at the center is surveyed by the phase difference sensor 132 and the distance survey processing unit 43 (step S02).

After this, likewise a distance LR between the projector apparatus 10 and the position of the projection image of the point arranged on the right seen from the projector apparatus 10 and a distance LL between the projector apparatus 10 and the position of the projection image of the point arranged on the left seen from the projector apparatus 10 are sequentially surveyed (steps S03 and S04).

Based on the obtained distance values of the three points, an angle θh in the leftward and rightward direction, of the screen projection surface on which the image is projected, with respect to the projection light axis is calculated (step S05).

Next, in place of the horizontal charge image HC, a vertical chart image VC show in FIG. 5B is projected based on the image data stored in the image storage unit 40 (step S06).

This vertical chart image VC is made up of three point images which are arranged at regular intervals in the vertical direction, in a manner that the center point coincides with the center point of the horizontal chart image HC.

While the vertical chart image VC is projected, a distance LU between the projector apparatus 10 and the position of the projection image of the point arranged at the upper side is surveyed by the phase difference sensor 131 and the distance survey processing unit 43 (step S07).

After this, likewise a distance LD between the projector apparatus 10 and the position of the projection image of the point arranged at the down side is surveyed (step S08). The distance LC between the projector apparatus 10 and the position of the projection image of the point arranged at the center is the same as that of the horizontal chart image HC. Therefore, since the distance LC has already been surveyed in step S02, the surveyed value obtained in step S02 is used and the surveying process for the distance LC is omitted.

Based on the distance values of the three points constituting the vertical chart image VC, an angle θv in the upward and downward direction, of the screen projection surface on which the image is projected, with respect to the projection light axis is calculated (step S09).

Next, the distance LC between the projector apparatus 10 and the position of the projection image of the point arranged at the center which is surveyed in step S02 is obtained as the distance value representing the projection image. Then, the projection lens 12 is moved by the lens motor 38 so that the projection lens 12 is set at an in-focus position corresponding to the distance value (step S10).

After this, keystone correction of image data to be expanded and stored in the video RAM 34 is performed by calculating angles for necessary keystone correction in order to measure how much and in which direction the screen projection surface is inclined on the whole and to determine whether the image to be projected should be shaped into a rectangle having an appropriate aspect ratio equal to that of an input image signal, based on the angle θh in the leftward and rightward direction and angle θv in the upward and downward direction of the screen projection surface on which the image is projected, which angles are obtained in steps S05 and S09 (step S11).

Figure 6:
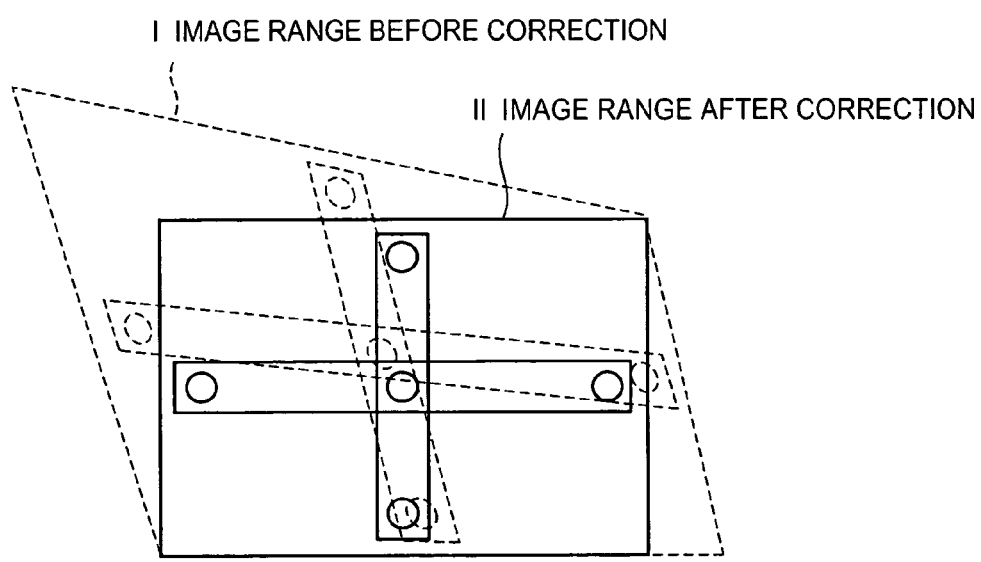
FIG. 6 is a diagram showing the concept of automatic keystone correction according to the embodiment of the present invention.

FIG. 6 illustrates in a slightly exaggerated manner, the change of the projection image before and after automatic keystone correction. A projection image I before correction indicated by the broken line is largely distorted both vertically and horizontally, and particularly the two sides of the rectangle that form the upper left corner are greatly distorted. Therefore, it is obvious that the projection surface of the screen is inclined toward the left side in the leftward and rightward direction and toward the upper side in the upward and downward direction, with respect to the projection light axis.

By applying automatic keystone correction to the projection image I, a rectangular projection image II having the most appropriate aspect ratio that is possible within the projection image I, is obtained.

Along with keystone correction, coordinate values x and y of the center position of the image, which is projected as a rectangle having the most appropriate aspect ratio, are calculated (step S12). Then, the horizontal chart image HC used in step S01 is moved such that its center point is positioned at the calculated x and y coordinates of the center position, and projected at this position (step S13).

In this state, the distance LC between the projector apparatus 10 and the position of the projection image of the center point is again surveyed by the phase difference sensor 132 and the distance survey processing unit 43 as a correct distance LK after keystone correction (step S14).

In conjunction with the projecting of the horizontal chart image HC after moving it as described above, a mechanism for changing the optical axis of photographing becomes necessary, in order to appropriately change the direction in which the distance survey lenses 13c and 13d of the phase difference sensor 132 face so that the lenses 13c and 13d can focus a light flux correspondingly onto the moved positions of the points of the horizontal chart image HC.

Then, based on the obtained distance LK, the projection lens 12 is moved by the lens motor 38 to a new in-focus position corresponding to the distance LK (step S15). Thus, the subroutine shown in FIG. 5A is once completed and the flow returns to the process of FIG. 4.

In FIG. 4, after the automatic focus process and automatic keystone correction process are performed in step M03, it is determined whether the above-described continue mode is set or not (step M04).

In a case where it is determined that the continue mode is set, it is determined whether the "AFK" key 15d is operated for the second time (step M05). If it is determined that the "AFK" key 15d is not operated for the second time, the flow returns to step M03 to perform the automatic focus process and automatic keystone correction process again.

In the state where the continue mode is set, the processes of steps M03 to M05 are repeatedly performed to continue performing the automatic focus process and automatic keystone correction process, until the "AFK" key 15d is operated for the second time.

In a case where it is determined in step M05 that the "AFK" key 15d is operated for the second time, and in a case where it is determined in step M04 that not the continue mode but the one shot mode is set, a state for terminating the automatic focus process and automatic keystone correction process, which are the interruption processes, is set (step M06). Then, the operation that has been performed before the "AFK" key 15d is operated is restored and the flow returns to step M01 to be on standby for the next operation of the "AFK" key 15d.

By performing automatic keystone correction in this manner upon operation of the "AFK" key 15d, a projection image whose center position is deviated is re-projected by bringing the center position (x, y) of the projection image obtained after automatic keystone correction into focus.

Therefore, by operating the "AFK" key 15d, it is possible to easily and quickly perform the automatic focus process and automatic keystone correction process in response to the user's intention to perform these processes, and to project an image appropriately anytime with influences of the projection environment eliminated.

Further, since in FIG. 5A the distance LK between the projector apparatus 10 and the center position (x, y) of the projection image obtained after automatic keystone correction is surveyed again for automatic focus, an image, which is brought into focus, can more securely be projected.

In FIG. 5A, it has been explained that the distance LK between the projector apparatus 10 and the center position (x, y) of the projection image obtained after automatic keystone correction is obtained by re-survey by performing the processes of steps S12 to S15. However, it may be possible to perform automatic focus after keystone correction, not by performing such a distance re-survey process, but by calculating the value of distance between the projector apparatus 10 and the center position (x, y).

Another example 1 of the subroutine regarding the process for such automatic keystone correction will now be explained.

Figure 7:
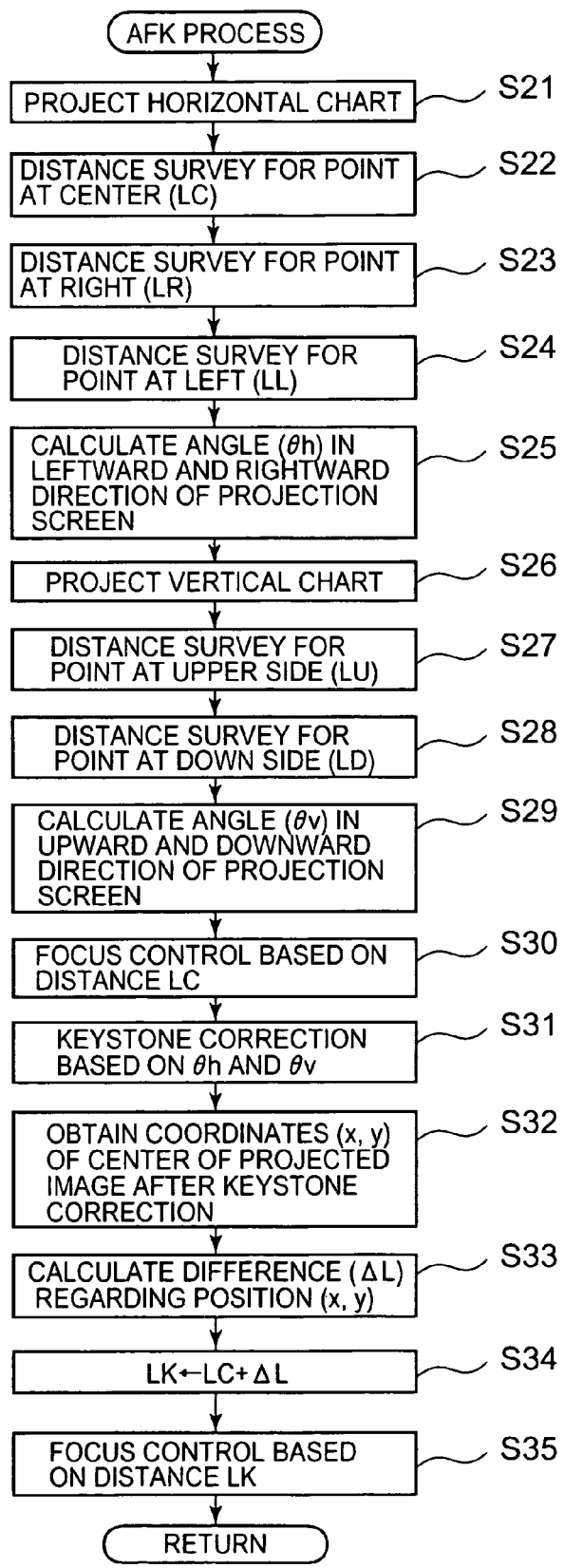
FIG. 7 is a flowchart showing another content of the process of the subroutine of the AFK process shown in FIG. 4.

FIG. 7 shows a subroutine representing another content of the automatic focus process and automatic keystone correction process to be performed in step M03 of FIG. 4. At the beginning of the process, the horizontal chart image HC shown in FIG. 5B is projected by the projection system including the projection lens 12, based on the image data stored in the image storage unit 40 (step S21).

This horizontal chart image HC is made up of three point images which are arranged at regular intervals in the horizontal direction.

While the horizontal chart image HC is projected, a distance LC between the projector apparatus 10 and the position of the projection image of the point arranged at the center is surveyed by the phase difference sensor 132 and the distance survey processing unit 43 (step S22).

After this, likewise a distance LR between the projector apparatus 10 and the position of the projection image of the point arranged at the right side seen from the projector apparatus 10, and a distance LL between the projector apparatus 10 and the position of the projection image of the point arranged at the left side seen from the projector apparatus 10 are sequentially surveyed (steps S23 and S24).

Based on the obtained distance values of the three points, an angle θh in the leftward and rightward direction, of the screen projection surface on which the image is projected, with respect to the projection light axis, is calculated (step S25).

Next, in place of the horizontal chart image HC, the vertical chart image VC shown in FIG. 5B is projected based on the image data stored in the image storage unit 40 (step S26).

The vertical chart image VC is made up of three point images which are arranged at regular intervals in the vertical direction, in a manner that the center point coincides with the center point of the above-described horizontal chart image HC.

While the vertical chart image VC is projected, a distance LU between the projector image 10 and the position of the projection image of the point arranged at the upper side is surveyed by the phase difference sensor 131 and the distance survey processing unit 43 (step S27).

After this, likewise a distance LD between the projector apparatus 10 and the position of the projection image of the point arranged at the down side is surveyed (step S28). The distance LC between the projector image 10 and the position of the projection image of the point arranged at the center is the same as that of the horizontal chart image HC. Therefore, since the distance LC is already surveyed in step S22, the value obtained in step S22 is used and the distance survey process for the distance LC is omitted.

Based on the distance values of the three points constituting the vertical chart image VC, an angle θv in the upward and downward direction, of the screen projection surface on which the image is projected, with respect to the projection light axis, is calculated (step S29).

Then, the distance LC between the projector apparatus 10 and the position of the projection image of the point arranged at the center which is surveyed in step S22 is obtained as a distance value representing the projection image. Then, the projection lens 12 is moved by the lens motor 38 to a new in-focus position corresponding to the distance value (step S30).

After this, keystone correction of image data to be expanded and stored in the video RAM 34 is performed by calculating angles for necessary keystone correction in order to measure how much and in which direction the screen projection surface is inclined on the whole and to determine whether the image to be projected should be shaped into a rectangle having an appropriate aspect ratio equal to that of an input image signal, based on the angle θh in the leftward and rightward direction and angle θv in the upward and downward direction of the screen projection surface on which the image is projected, which angles are obtained in steps S25 and S29 (step S31).

While keystone correction is performed, coordinate values x and y of the center position of the image, which is projected as a rectangle having an appropriate aspect ratio, are calculated (step S32). Then, a difference ΔL between a distance between the projector apparatus 10 and the calculated center position (x, y) and the distance LC between the projector apparatus 10 and the point arranged at the center surveyed in step S22, is calculated (step S33).

Then, a correct distance LK after keystone correction is calculated by adding the calculated difference ΔL in distance to the distance LC between the projector apparatus 10 and the point arranged at the center (step S34).

Based on the calculated distance LK, the projection lens 12 is moved by the lens motor 38 to a new in-focus position corresponding to the distance LK (step S35). Thus, the subroutine shown in FIG. 7 is once completed and the flow returns to the process of FIG. 4.

By calculating the distance between the projector apparatus 10 and the center position (x, y) of the image obtained after automatic keystone correction by using the distance values obtained by surveying the distances between the projector apparatus 10 and the plurality of point positions, the distance re-survey process shown in FIG. 5A becomes unnecessary. Further, the above-described mechanism for changing the optical axis of photographing of the distance survey lenses 13c and 13d of the phase difference sensor 132 becomes unnecessary. This keeps the structure of the apparatus from becoming complex, while calculation performed instead of re-survey makes it possible to quickly switch to the projection operation.

The calculation for automatic focus control for correcting deviation of the center position of the projection image obtained after keystone correction can be more simplified than the process shown in FIG. 7.

Another example 2 of the subroutine regarding the process for such automatic keystone correction will now be explained.

In this example 2, the distance survey lenses 13c and 13d of the phase difference sensor 132 have a structure for shifting their optical axis of light flux focusing in the upward direction or downward direction at a predetermined angle.

FIG. 8A shows a subroutine representing another content of the automatic focus process and automatic keystone correction process performed in step M03 of FIG. 4 instead of the process shown in FIG. 5A. At the beginning of the process, a horizontal chart upper image UH shown in FIG. 8B is projected by the projection system including the projection lens 12 based on image data stored in the image storage unit 40 (step S41).

This horizontal chart upper image UH is made up of three point images which are arranged at regular intervals in the horizontal direction. In conjunction with the projection of the horizontal chart upper image UH, the distance survey lenses 13c and 13d of the phase difference sensor 132 shift their optical axis of light flux focusing in the upward direction at a predetermined angle.

While the horizontal chart upper image UH is projected, a distance UC between the projector apparatus 10 and the position of the projection image of the point arranged at the center, a distance UL between the projector apparatus 10 and the position of the projection image of the point arranged at the left, and a distance UR between the projector apparatus 10 and the position of the projection image of the point arranged at the right are sequentially surveyed by the phase difference sensor 132 and the distance survey processing unit 43 (step S42).

Next, a horizontal chart middle image MH is projected by the projection system including the projection lens 12 based on the image data stored in the image storage unit 40 (step S43).

Likewise the horizontal chart upper image UH, the horizontal chart middle image MH is made up of three point images which are arranged at regular intervals in the horizontal direction. When the horizontal chart middle image MH is projected, the distance survey sensors 13c and 13d of the phase difference sensor 132 do not shift their optical axis of light flux focusing either in the upward direction or in the downward direction.

While the horizontal chart middle image MH is projected, a distance MC between the projector apparatus 10 and the position of the projection image of the point arranged at the center, a distance ML between the projector apparatus 10 and the position of the projection image of the point arranged at the left, and a distance MR between the projector apparatus 10 and the position of the projection image of the point arranged at the right are sequentially surveyed by the phases difference sensor 132 and the distance survey processing unit 43 (step S44).

Then, a horizontal chart lower image LH shown in FIG. 8B is projected by the projection system including the projection lens 12 based on the image data stored in the image storage unit 40 (step S45).

Likewise the horizontal chart upper image UH and the horizontal chart middle image MH, the horizontal chart lower image LH is made up of three point images which are arranged at regular intervals in the horizontal direction. When the horizontal chart lower image LH is projected, the distance survey lenses 13c and 13d of the phase difference sensor 132 shift their optical axis of light flux focusing in the downward direction at a predetermined angle.

While the horizontal chart lower image LH is projected, a distance LC between the projector apparatus 10 and the position of the projection image of the point arranged at the center, a distance LL between the projector apparatus 10 and the position of the projection image of the point arranged at the left, and a distance LR between the projector apparatus 10 and the position of the projection image of the point arranged at the right are sequentially surveyed by the phase difference sensor 132 and the distance survey processing unit 43 (step S46).

As a result, distance values of the total of 9 points (vertical 3 points×horizontal 3 points) are obtained. An angle θh in the leftward and rightward direction, of the screen projection surface on which the image is projected, with respect to the projection light axis is calculated by subtracting the distance MR between the projector apparatus 10 and the position of the projection image of the point arranged at the right of the horizontal chart middle image MH, from the distance ML between the projector apparatus 10 and the position of the projection image of the point arranged at the left (step S47).

Next, an angle θv in the upward and downward direction, of the screen projection surface on which the image is projected, with respect to the projection light axis is calculated by subtracting the distance LC between the projector apparatus 10 and the position of the projection image of the point arranged at the center of the horizontal chart lower image LH, from the distance UC between the projector apparatus 10 and the position of the projection image of the point arranged at the center of the horizontal chart upper image UH (step S48).

Keystone correction of image data to be expanded and stored in the video RAM 34 is performed by calculating angles for necessary keystone correction in order to measure how much and in which direction the screen projection surface is inclined on the whole and to determine whether the image to be projected should be shaped into a rectangle having an appropriate aspect ratio equal to that of an input image signal, based on the angle θh in the leftward and rightward direction and angle θv in the upward and downward direction, of the screen projection surface on which the image is projected, which angles are obtained in steps S47 and S48 (step S49).

While this keystone correction is performed, coordinates x and y of the center position of the image projected as a rectangle having an appropriate aspect ratio are calculated (step S50). Then, a distance survey point that is closest to the calculated x and y coordinates of the center position is selected from the nine distance survey points shown in FIG. 8B (step S51).

Then, the distance between the projector apparatus 10 and the selected distance survey point is used as a correct distance LK after keystone correction (step S52). Then, the projection lens 12 is moved by the lens motor 38 to a new in-focus position corresponding to the distance LK (step S53). Thus, the subroutine shown in FIG. 8 is once completed and the flow returns to the process shown in FIG. 4.

By using the distance value of the distance survey point closest to the center position (x, y) of the image obtained after automatic keystone correction, which is selected from a plurality of, for example 9 points originally used for distance survey, it becomes unnecessary to re-survey the distance or to calculate a difference ΔL between the distance LC between the projector apparatus 10 and the point arranged at the center before keystone correction, and the distance between the projector apparatus 10 and the center position (x, y) of the projection image obtained after keystone correction. Therefore, it is possible to more quickly switch to the projection operation.

In the above-described embodiment, it has been explained that the distance between the projector apparatus 10 and each point on the projection image shown in FIG. 5B or FIG. 8B is surveyed by the phase difference sensors 131 and 132. However, means for surveying distance is not limited to the phase difference sensors 131 and 132. For example, a plurality of active type sensors or the like, which survey distance by oscillating an infrared ray, an ultrasonic wave, a laser light, etc. and receiving the reflected wave, may be arranged correspondingly to a plurality of points, or such a sensor may be structured so as to be able to change the angle of oscillation.

Further, the means for surveying distance may not be sensors. For example, an imaging element such as a CCD, and an imaging unit having an automatic focus function of a contrast type or the like may be used, so that the distance between the position of a focus lens at the time when each of a plurality of distance survey points is automatically focused on and each of the plurality of distance survey points may be calculated.

The present invention is not limited to the above-described embodiment, but may be variously modified within the scope of the meaning of the present invention.

Inventions of various stages are included in the above-described embodiment, and various inventions can be extracted by appropriately combining a plurality of components that are disclosed herein. For example, in a case where at least one of the problems described in the section of Background of the Invention can be solved and at least one of the objects of the present invention can be achieved even if some of the components are deleted from the components disclosed herein, the configuration from which such components are deleted can be extracted as an invention.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-299888 filed on Aug. 25, 2003 and including specification, claims, drawings and summary. The disclosure of the above Japanese patent application is incorporated herein by reference in its entirety.

What is claimed is:

1. A projector apparatus comprising:
a projection unit which projects an image corresponding to an input image signal;
an instruction unit which issues an instruction for performing keystone correction;
a distance survey unit which surveys a distance between the projector apparatus and each of a plurality of positions on the image projected by the projection unit, in accordance with an instruction from the instruction unit;
a keystone correction unit which performs keystone correction of the image projected by the projection unit, such that the image becomes a rectangle having an appropriate aspect ratio based on the distances obtained by the distance survey unit; and
a focus control unit which controls a lens of the projection unit so as to bring the keystone-corrected image corrected by the keystone correction unit into focus at a center position of the keystone-corrected image;
wherein the focus control unit brings the keystone-corrected image into focus based on a distance between the projector apparatus and the center position of the keystone-corrected image, and wherein the distance to the center position of the keystone-corrected image is obtained by the distance survey unit by re-surveying.

2. A projector apparatus comprising:
a projection unit which projects an image corresponding to an input image signal;
an instruction unit which issues an instruction for performing keystone correction;
a distance survey unit which surveys a distance between the projector apparatus and each of a plurality of positions on the image projected by the projection unit, in accordance with an instruction from the instruction unit;

a keystone correction unit which performs keystone correction on the image projected by the projection unit, such that the image becomes a rectangle having an appropriate aspect ratio based on the distances obtained by the distance survey unit; and a focus control unit which controls a lens of the projection unit so as to bring the keystone-corrected image corrected by the keystone correction unit into focus at a center position of the keystone-corrected image;

wherein the distance survey unit surveys distances between the projector apparatus and a plurality of positions on a chart image which is projected for distance surveying; and wherein the chart image projected for distance surveying comprises a horizontal chart image for surveying distances between the projector apparatus and a plurality of positions in a horizontal direction, and a vertical chart image for surveying distances between the projector apparatus and a plurality of positions in a vertical direction.

3. A projection method comprising:

projecting, with a projection unit of a projector apparatus, an image corresponding to an input image signal;

issuing an instruction for performing keystone correction;

surveying distances between a projector apparatus and a plurality of positions on the projected image, in accordance with the instruction;

a performing keystone correction on the image projected by the projection unit, such that the image becomes a rectangle having an appropriate aspect ratio, based on the distances obtained by the distance surveying; and controlling a lens of the projection unit sa as to bring the keystone-corrected image into focus at a center position of the keystone-corrected image;

wherein the keystone-corrected image is brought into focus based on a distance between the projector apparatus and the center position of the keystone-corrected image, and the distance to the center position of the keystone-corrected image is obtained by re-surveying.

4. A computer-readable recording medium having a program stored thereon that is executable by a computer to cause the computer to execute a projection method which comprises:

projecting, with a projection unit of a projector apparatus, an image corresponding to an input image signal;

issuing an instruction for performing keystone correction;

surveying distances between a projector apparatus and a plurality of positions on the projected image, in accordance with the instruction;

performing keystone correction on the image projected by the projection unit, such that the image becomes a rectangle having an appropriate aspect ratio, based on the distances obtained by the distance surveying step; and controlling lens of the projection unit as to bring the keystone-corrected image into focus at a center position of the keystone-corrected image;

wherein the keystone-corrected image is brought into focus based on a distance between the projector apparatus and the center position of the keystone-corrected image, and the distance to the center position of the keystone-corrected image is obtained by re-surveying.

* * * * *